US008296190B1

(12) United States Patent
Lemmons et al.

(10) Patent No.: US 8,296,190 B1
(45) Date of Patent: Oct. 23, 2012

(54) DIGITAL CONTENT AGGREGATION

(75) Inventors: Mark Lemmons, Arvada, CO (US); Dan Weiner, Denver, CO (US); Cameron Pope, Denver, CO (US); Tucker Roth, Superior, CO (US); Jeffrey Hyde, Denver, CO (US); Kevin Schaff, Littleton, CO (US)

(73) Assignee: T3Media, Inc., Denver, CO (US)

( * ) Notice: Subject to any disclaimer, the term of this patent is extended or adjusted under 35 U.S.C. 154(b) by 0 days.

(21) Appl. No.: 13/446,691

(22) Filed: Apr. 13, 2012

(51) Int. Cl.
 *G06Q 30/00* (2012.01)
(52) U.S. Cl. ... 705/26.1; 705/59; 705/26.43; 705/26.44; 705/27.1
(58) Field of Classification Search ............... 705/51, 705/59, 26.1, 26.43, 26.44, 27.1
See application file for complete search history.

(56) References Cited

U.S. PATENT DOCUMENTS

| 5,204,897 | A | 4/1993 | Wyman |
| 6,282,653 | B1 | 8/2001 | Berstis et al. |
| 6,766,305 | B1 | 7/2004 | Fucarile et al. |
| 7,020,781 | B1 * | 3/2006 | Saw et al. ............ 705/51 |
| 7,136,838 | B1 | 11/2006 | Peinado et al. |
| 7,269,577 | B2 | 9/2007 | Stefik et al. |
| 7,516,147 | B2 * | 4/2009 | Kranz et al. ............ 1/1 |
| 7,734,551 | B1 | 6/2010 | Lindeman et al. |
| 7,747,466 | B2 * | 6/2010 | Fernandez ............ 705/14.47 |
| 7,945,487 | B2 | 5/2011 | Ruef et al. |
| 8,082,184 | B2 | 12/2011 | Yruski et al. |
| 2002/0138291 | A1 | 9/2002 | Vaidyanathan et al. |
| 2004/0199471 | A1 | 10/2004 | Hardjono |
| 2004/0225574 | A1 | 11/2004 | Arnold et al. |
| 2004/0225616 | A1 | 11/2004 | Arnold et al. |
| 2004/0254883 | A1 * | 12/2004 | Kondrk et al. ............ 705/51 |
| 2005/0004873 | A1 | 1/2005 | Pou et al. |
| 2005/0256777 | A1 | 11/2005 | Kotera et al. |
| 2006/0020556 | A1 | 1/2006 | Hamnen |
| 2006/0167803 | A1 | 7/2006 | Aydar et al. |
| 2007/0073626 | A1 | 3/2007 | Reeder et al. |
| 2007/0208670 | A1 | 9/2007 | Quoc |
| 2007/0282714 | A1 | 12/2007 | Aydar et al. |

(Continued)

FOREIGN PATENT DOCUMENTS

JP 2003337892 A 11/2003

OTHER PUBLICATIONS

Anon., "Tower Records Sets up Shop, Online," PC MAgazine Online, Jun. 26, 2006.*

(Continued)

*Primary Examiner* — Nicholas D Rosen
(74) *Attorney, Agent, or Firm* — Kilpatrick Townsend & Stockton LLP

(57) ABSTRACT

Embodiments of the invention are directed toward a content marketplace where digital content can be offered for use by licensees in exchange for a license from a licensor. In some embodiments the content marketplace can provide this licensing forum without hosting the digital content. Instead, the content market place can provide links to the digital content at a digital content host (e.g. third party website). For instance, the content marketplace can embed the digital content into the content market place by embedding an Internet address that points to the digital content at the digital content host. In some embodiments the content marketplace can also provide, among other things, searchable index of digital content available for license, license attributes for license agreements, descriptions of the digital content, and/or standard licenses that can be agreed upon.

17 Claims, 12 Drawing Sheets

U.S. PATENT DOCUMENTS

| | | |
|---|---|---|
| 2008/0182509 A1* | 7/2008 | Khedouri et al. ............ 455/3.06 |
| 2008/0208755 A1* | 8/2008 | Malcolm ........................ 705/59 |
| 2008/0228578 A1 | 9/2008 | Mashinsky |
| 2008/0250029 A1* | 10/2008 | Fernandez ...................... 707/10 |
| 2008/0319867 A1 | 12/2008 | Rosenberg et al. |
| 2009/0018931 A1 | 1/2009 | Kling et al. |
| 2009/0094165 A1 | 4/2009 | Royo et al. |
| 2009/0106847 A1 | 4/2009 | Krupman et al. |
| 2009/0313556 A1 | 12/2009 | Hamilton, II et al. |
| 2010/0114739 A1 | 5/2010 | Johnston |
| 2010/0287061 A1 | 11/2010 | Terheggen et al. |
| 2011/0022846 A1 | 1/2011 | Ginter et al. |
| 2011/0055090 A1 | 3/2011 | Ross |
| 2011/0087886 A1 | 4/2011 | Anderson |
| 2011/0099083 A1 | 4/2011 | Karpinsky |
| 2011/0137811 A1 | 6/2011 | Patel et al. |
| 2011/0161201 A1 | 6/2011 | Stocker |
| 2011/0191206 A1 | 8/2011 | Kiarostami |
| 2011/0231290 A1 | 9/2011 | Narcisse et al. |
| 2011/0282738 A1 | 11/2011 | Thomas |
| 2011/0288910 A1 | 11/2011 | Garg et al. |
| 2012/0036048 A1* | 2/2012 | Robb et al. ................... 705/27.2 |

OTHER PUBLICATIONS

Christman, E., "Lights! Action! Universal Music Publishing Group inks deals to expand its film/TV assets," Billboard, vol. 123, No. 7, p. 54, Feb. 26, 2011.*

U.S. Appl. No. 13/446,603, filed Apr. 13, 2012, Office Action mailed Jul. 23, 2012, 11 pages.

* cited by examiner

Use:
Standard (1 use)
Extended (many uses)

Price:

Restrictions:

*Examples*

☐ Entertain Other Offers?
○ Use standard agreement
○ Use Creative Commons agreement
○ Use your own agreement

Delivery Format:

*Examples*

URL for file location:

(Submit)

*Figure 7*

DIGITAL CONTENT AGGREGATION

BRIEF SUMMARY

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

Embodiments of the invention are directed toward digital content marketplace that provides an interface for licensees and/or licensors to provide digital content. A number of embodiments and examples are described herein.

Some embodiments of the invention include a method performed by a computer system that includes receiving from a licensee an Internet address that points to digital content or a representation of the digital content located at a digital content host, determining a licensor from the Internet address that points to the digital content; and sending an electronic message to the licensor with a request to license the digital content. In some embodiments a third party has rights to license the digital content. In some embodiments the electronic message specifies the digital content. In some embodiments one or more proposed license attributes can also be received from the licensee. In some embodiments a licensor can be determined by sending information to a representative and receiving contact information from the representative.

Some embodiments of the invention include a method performed by a computer system that includes receiving from a licensor an Internet address that points to digital content (or a representation of the digital content) that can be licensed from the licensor by a licensee, receiving a proposed license attributes from the licensor, determining attributes of the digital content from metadata associated with the Internet address that points to the digital content, indexing the digital content based on the attributes of the digital content, and providing the digital content to licensees through a content marketplace. The digital content can typically by hosted at the digital content host and the content marketplace embeds the digital content using an Internet address that points to the digital content host.

Some embodiments of the invention include a method that can comprise receiving account identifiers from a licensor for an account at a digital content host containing digital content, automatically accessing the digital content host, by the computer system, using the account identifiers, searching the digital content host for digital content associated with the account, identifying an Internet address found on the digital content host that points to digital content found at the digital content host, identifying metadata associated with the digital content found on the digital content host, embedding an Internet address that points to the digital content found at the digital content host on a content marketplace website, and indexing the digital content using either or both the Internet address and the metadata. In some configurations the digital content is hosted at the digital content host and the content marketplace embeds the digital content using an Internet address that points to the digital content host.

BRIEF DESCRIPTION OF THE DRAWINGS

Illustrative embodiments of the present invention are described in detail below with reference to the following drawing figures.

FIG. 7 shows a screen shot of a webpage that can be used to enter license attributes associated with digital content according to some embodiments of the invention.

DETAILED DESCRIPTION

Figure 1:
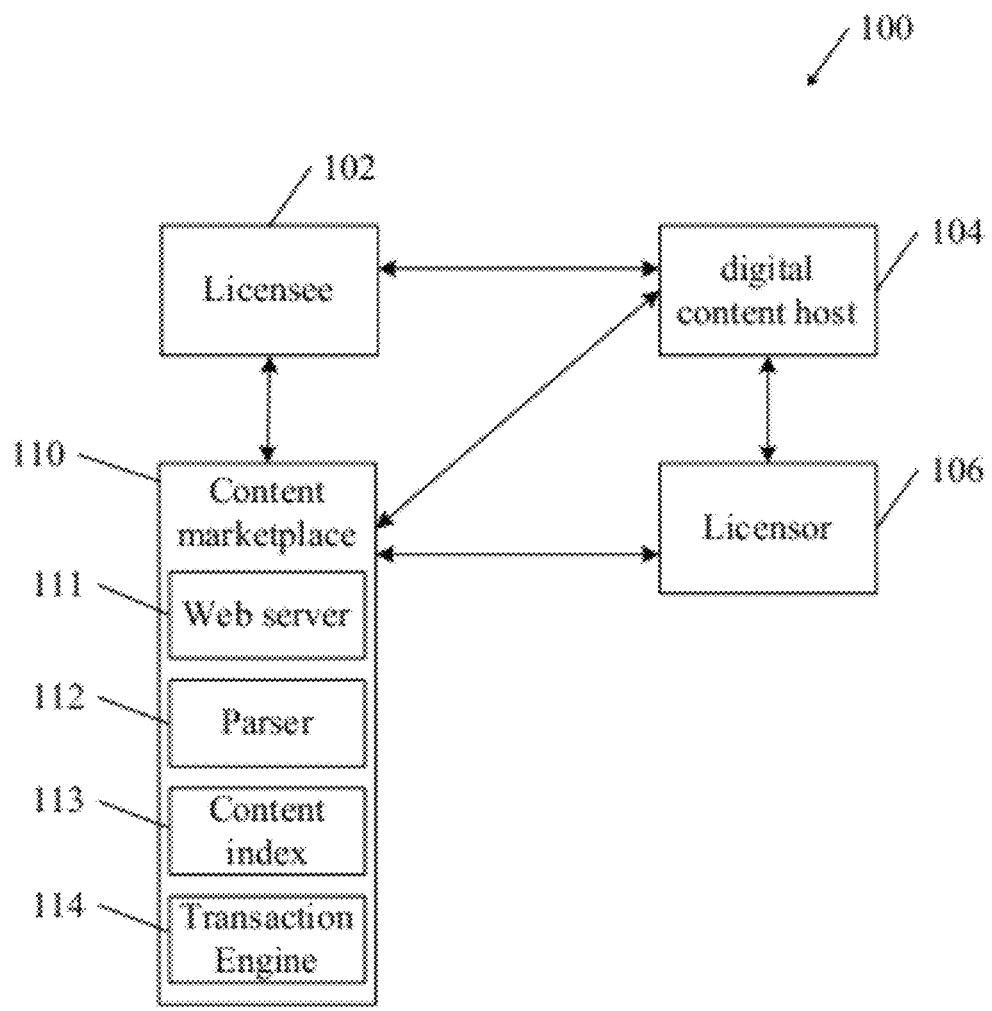
FIG. 1 shows a block diagram of a system that can be used to implement various embodiments of the invention.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments of the invention are directed toward a content marketplace where digital content can be offered for use by licensees in exchange for a license from a licensor. The content marketplace can provide this licensing forum without hosting the digital content. Instead, the content market place can provide an Internet address that points to the digital content at a third party digital content host. For instance, the content marketplace can provide the digital content to a licensee by embedding an Internet address that points to the digital content or a representation of the digital content hosted by a digital content host. For example, a video hosted on YouTube can be embedded in the content marketplace website using an Internet address that points to the digital content at youtube.com.

The content marketplace can also provide indexing and searching functions to help licensees find the digital content. The indexing or searching can use metadata associated with digital content at the digital content host, or content attributes or descriptions provided by the licensor. Moreover, the content marketplace can provide a forum for negotiating license agreements between the licensee and the licensor. The content marketplace can also provide a mechanism for the licensor to warrant that they have sufficient rights in the digital content to license the digital content.

As used herein, the term "licensee" is an individual or organization that has been granted a license or seeks to use digital content according to the terms, conditions, preferences, references, restrictions, etc. outlined in a license agreement.

As used herein, the term "webpage" is a document or information resource that can be accessed through a web browser or application on a computer, laptop, smart phone, tablet, or a mobile device.

As used herein, the term "licensor" is an individual, group, or organization that grants or offers to a licensee the right to use digital content according to the terms, conditions, preferences, references, restrictions, etc. outlined in a license agreement.

As used herein, the term "digital content" is any type of content in digital form. Digital content can include digital video, images, music, sounds, text, artwork, program, code, etc. regardless of the format or coding of the digital content and also includes proxy files and other representation files of any such digital content.

As used herein, the term "Internet address" is an identifier specifying where a file may be found on the Internet. For example, an Internet address can be a resource, uniform resource locator (URL), uniform resource identifier, international resource identifier, document address, page address, Facebook ID (using the Facebook graph API), or an IP address. An Internet address, for example, may identify the location of a webpage, file, video, image, program, etc. Moreover, an Internet address may be embedded within a webpage that links whatever is pointed to by the Internet address with the webpage.

FIG. 1 shows a block diagram of system 100 that can be used to implement various embodiments of the invention. As shown, content marketplace 110 can be communicatively coupled with licensee 102, digital content host 104, and/or licensor 106. These components can be communicatively coupled through a network, such as the Internet. Means of communication can vary. For example, various messages and/or packets can be shared between the various components that can include instructions, links, assertions, messages, indications, etc.

Licensee 102 and/or licensor 106 can communicate with the other components using, for example, a computer, tablet, or smart phone. Communication can occur through the Internet. For instance, using a web browser, application or app, licensee 102 can view a website provided by digital content host 104, licensor 106, and/or content marketplace 110. Similarly, licensor can view a website provided by digital content host 104 and/or content marketplace 110. Any number of licensees or licensors can be used.

Digital content host 104, for example, can include any website that hosts, displays, and/or provides digital content to visitors of the website. Examples of digital content host 104 can include youtube.com, facebook.com, vimeo.com, istockphoto.com, gettyimages.com, shutterstock.com, etc. Digital content host 104, for example, can be a file sharing site, a social media site, a digital archive, a streaming video site, etc. Digital content host 104 can be any type of website without limitation. While digital content host 104 is shown as a single block, one or more digital content hosts may be used in the various embodiments described herein.

In some embodiments, digital content host 104 can host a representation of the digital content that is available for licensing instead of the of the actual digital content. For example, digital content host 104 can provide a thumbnail, condensed, compressed, description, and/or lower resolution version of the digital content. In some embodiments, digital content host 104 may not host nor store the actual digital content that is available for licensing. Instead, a representation can be provided. Throughout this disclosure, wherever a digital content host is described as hosting, providing, or displaying digital content this includes hosting, providing, or displaying a representation of the digital content.

Content marketplace 110 can include webserver 111, parser 112, content index 113, and transaction engine 114. Various other modules may also be used. Moreover, the functionality of any of these modules may be combined with other modules and/or any module may be excluded. Content marketplace 110 can provide a digital content marketplace for content hosted at digital content host 104 for licensee 102 to license from licensor 106.

Webserver 111 can provide a listing of digital content for licensee 102 to search, browse, or peruse. While a user may browse the digital content listed in the content marketplace, the actual digital content or a representation thereof is hosted or stored at digital content host 104. For example, while the website(s) provided by webserver 111 can provide selectable or viewable digital content (or representations thereof), the actual digital content is not hosted by webserver 111. Instead, the digital content (or representations thereof), is hosted or stored at digital content host 104. This can be accomplished in any number of ways. For example, an Internet address that points to the digital content can be embedded within the website code allowing the digital content to be displayed to a visitor of the website. In some embodiments, webserver 111 can provide an interface that can be accessed by a licensee and/or licensor through an application on a smart phone or computer.

Embedded content, for example, is content that imports digital content into the webpage from the digital content host 104. Webserver 111 can provide a webpage that includes the Internet address of the digital content at the digital content host and embed the digital content using the Internet address. Thus, when licensee 102 directs a web browser to the webpage provided by webserver 111 (or uses an application to do so); licensee's web browser will retrieve the webpage information from webserver 111. The webpage will include the Internet address that points to the digital content stored at the digital content host 104. The browser will then retrieve the digital content from the digital content from the digital content host 104 and display the content within the webpage within the web browser window. In this way, content marketplace 110 can provide a listing of licensable content that is stored or represented at digital content host 104.

Content marketplace 110 can also include parser 112. Parser 112 can find, access, and/or interpret metadata found at a digital content hoss. This metadata can describe the type of digital content such as an image, music, video, programs, etc.; previewable content; keywords associated with the digital content; and/or descriptions of the digital content such as encoding, aspect ratio, compression, storage size; embeddable players or previewable element. The metadata can be copied and saved in the content marketplace in association with an Internet address that points to the digital content. The digital content can be embedded with a player or programmable element. Parser 112 can interpret this metadata, for example, as part of listing of the metadata in content index 113, identifying a licensor, determining how to display the digital content in the content marketplace, identifying (potential) license attributes, etc.

In some embodiments of the invention, parser 112 can search and/or interpretfor digital content at specific types of webpages. In yet other embodiments, parser 112 can search and/or interpret secure websites using authentication credentials provided by licensor 106. For instance, a licensor can request that content marketplace 110 list their content found on a secure webpage. The licensor can provide their login credentials and parser 112 can access and crawl through the content found on the secure website to find digital content for the content market place and interpret the digital content.

Parser 112, for example, can include ants, automatic indexers, bots, crawler, web spiders, web robots, or web scutters. Parser 112 can be a computer system and/or program that systematically searches the Internet or specific digital content hosts for licensable content. Parser 112 may not copy the digital content; instead parser 112 can find the digital content at third party webpages and return the Internet address that points to the digital content (or representations thereof).

Content marketplace 110 can also include content index 113. Content index 113 can include a listing of the digital content available for licensing. The listing, for example, can associate the Internet address to the digital content with, for example, metadata from the digital content hosting the digital content (or a representation thereof), the type of content, media format, pricing, delivery method, etc. Content index 113 can comprise one or more databases and/or computers.

Content marketplace 110 can also include transaction engine 114. Transaction engine 114 can provide a forum for a licensee and a licensor to negotiate license attributes. In some embodiments, transaction engine 114 can work in conjunction with web server 111 to provide this forum to the licensor and/or licensee. In some embodiments, transaction engine 114 can provide a webpage that allows the licensee to agree to license attributes provided by the licensor and/or allow the licensee to propose new license attributes. If the licensee proposes new license attributes, then transaction engine 114 can prepare a message or webpage that can be sent to the licensor with these new attributes, whereupon the licensor can agree to these new attributes or counter these additional attributes. In some embodiments, when license attributes are agreed upon by both the licensee and licensor, then transaction engine 114 can provide a license agreement to the licensor and the licensee that is consistent with and/or includes the agreed upon license attributes and provide interfaces that allows both the licensee and the licensor to assert their agreement with the license agreement.

Figure 2:
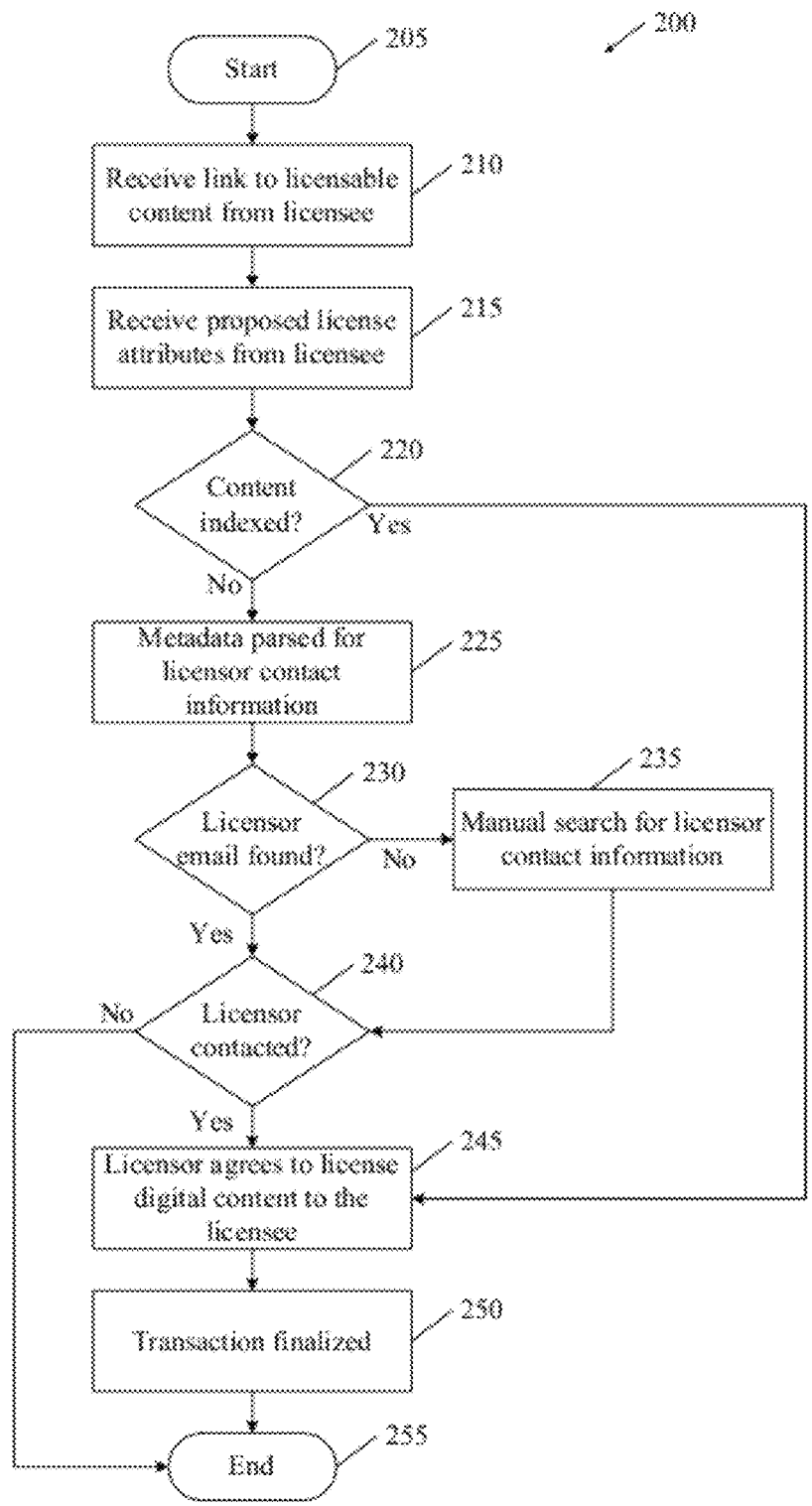
FIG. 2 is a flowchart of a process that can be used to receive an Internet address that points to the digital content from a licensee according to some embodiments of the invention.

FIG. 2 is a flowchart of process 200 that can be used to receive an Internet address that points to digital content identified by a licensee that the licensee wishes to license, according to some embodiments of the invention. In some embodiments, process 200 can be performed by content marketplace 110. Process 200 can start at block 205. At block 210 an Internet address that points to the digital content can be received. The Internet address can be received, for example, at content marketplace 110 through webserver 111. The Internet address can point to digital content located on another server that the licensee wishes to license. The Internet address can be received in any number of ways. For example, the licensee can copy the Internet address (e.g., a URL) from the address line in their browser and then paste the Internet address into a text field on the content marketplace webpage. As another example, the Internet address can be received via email, text message, using an app, or using an application. As yet another example, the Internet address can be received through a software application (such as a browser add in) that is used by the licensee that allows the licensee to use specific mouse and/or keystrokes to indicate the digital content they wish to license. Various other techniques may be used.

At block 215, in some embodiments, proposed license attributes can be received from the licensee. These license attributes can be received in any number of ways. The license attributes can be received in the same manner as the Internet address was received at block 210. For example, one or more requested license attributes can be received through a webpage hosted by content marketplace 110. An example of a screen shot that can be used to enter this information is shown in FIG. 7. These attributes can include any number of conditions, prices, restrictions, references, preferences, etc. that the licensee is willing to accept in order to license the digital content from the licensor. In some embodiments the licensee may not provide license attributes.

At block 220, process 200 can determine whether the digital content has already been indexed into the content marketplace. If the digital content was previously entered into the content marketplace, then process 200 proceeds to block 245. If not, then process 200 proceeds to block 225 and metadata and/or code associated with the digital content can be automatically parsed (or searched) for contact information of the licensor. This can be done, for example, using parser 112. This contact info can include the licensor's email, phone number, Facebook profile name, digital content host account identifier, etc. If, at block 230, the licensor contact information (e.g., email or account identifier) is found then process 200 proceeds to block 240; otherwise the process proceeds to block 235.

At block 235, a manual search for licensor contact information can be requested from a content marketplace representative. For example, at block 235 a task can be placed in a queue of tasks to be performed by the content marketplace representative. The task can request that the content marketplace representative search for the contact information for a licensor of the digital content pointed to by the Internet address. This can be done in any manner.

Following block 230 or 235, a licensor of the digital content can be contacted regarding entering into a license with the licensee to use the digital content at block 240. A message (e.g., an email, text, or other message) may be automatically sent from the content marketplace to the licensor without any human interaction. In some embodiments, the email can include the proposed license attributes. In some embodiments, the licensor can be contacted via electronic mail. In some embodiments, this electronic mail can be sent automatically when the licensor's email is found at block 230 and/or when the licensor's email is found by a representative and entered into the system at block 235. Either way, an email can be automatically sent to the licensor. In some embodiments the licensor can be contacted through a social networking site (e.g., Facebook) or through a webpage.

The licensor can respond in a number of ways. For example, the licensor can turn down or ignore the request. As another example, the licensor can respond with modified (or new, different, updated, changed, etc.) license attributes. As yet another example, the licensor can agree with the license attributes presented by the licensee. As another example, transaction engine 114 can provide an interface for the licensee and/or licensor to negotiate the license attributes. In some embodiments, transaction engine 114 can provide a listing of license terms and the associated cost of the license terms. Regardless of how the license terms are agreed to, (e.g., the license attributes presented by the licensee or modified license attributes), at block 245 the licensor can agree to license the digital content to the licensee according to license terms.

A license agreement can be created that incorporates the various license attributes agreed upon by the licensor and the licensee. Both parties can represent agreement to the license presented in the license agreement through the website.

At block 250 the transaction can be finalized. The transaction can be finalized in number of ways and/or may include any combination things. For example, both the licensor and the licensee can be presented with the agreed upon license attributes and formally agree to licenses terms by selecting a button asserting agreement on the content marketplace website. As another example, the licensee can remit payment to the content marketplace according to the agreed upon license price within the license attributes. The content marketplace can then remit payment to licensor minus any required fees (e.g., transaction fees and/or royalty fees). As yet another example, the transaction can be finalized when the licensee confirms that they have received the digital content from the licensor. This can be done through the content marketplace or via email or other digital medium. For example, if the license attributes specify that the licensee holds all rights to the digital content, the digital content can be removed from the content marketplace. As another example, if the license attributes specify an exclusive license in print media, then restrictions specifying this restriction can be added to the license attributes.

The various blocks shown in process 200 can occur in any order. Moreover, blocks can be skipped or deleted, and/or other blocks may be added without limitation.

Figure 3:
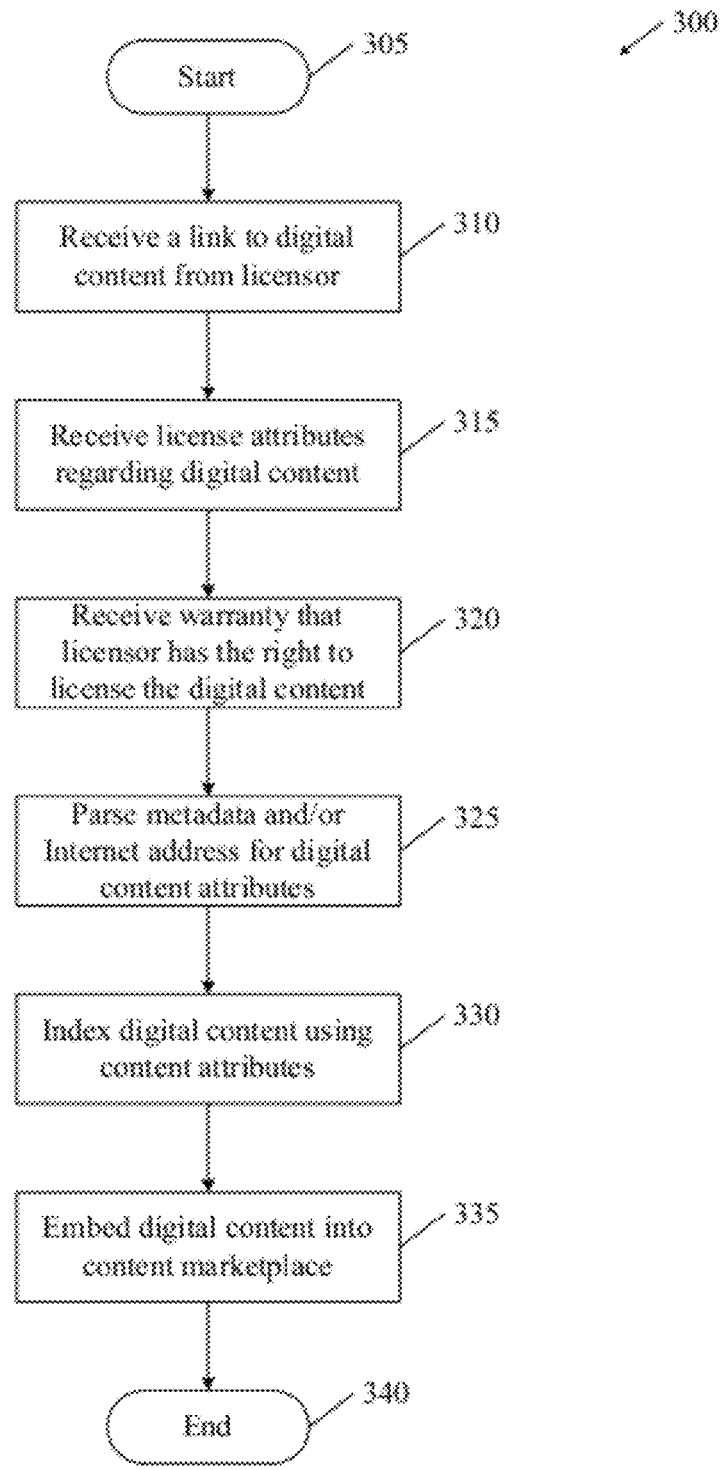
FIG. 3 is a flowchart of a process that can be used to receive an Internet address that points to the digital content from a licensor for entry into a content marketplace according to some embodiments of the invention.

FIG. 3 is a flowchart of process 300 that can be used to receive an Internet address that points to the digital content from a licensor for entry into the content marketplace according to some embodiments of the invention. In some embodiments, process 300 can be performed by content marketplace 110. Process 300 can start at block 305. At block 310 an Internet address that points to the digital content can be received from a licensor. The Internet address can be received, for example, at content marketplace 110 through webserver 111. The Internet address can point to digital content located on another server that the licensor wishes to license. The Internet address can be received in any number of ways. For example, the licensor can copy the Internet address (e.g., URL) from the address line in their browser and then paste the Internet address into a text field on the content marketplace webpage. As another example, the Internet address can be received via email or text message. As yet another example, the Internet address can be received through a software application (such as a browser add in) that is used by the licensor that allows the licensor to use specific mouse and/or keystrokes to indicate the digital content they wish to license. Various other techniques may be used.

At block 315 license attributes can be received from the licensor. The license attributes can be received in any number of ways. The license attributes can be received in the same manner as the Internet address received at block 310. For example, one or more requested license attributes can be received through a webpage hosted by content marketplace 110. An example of a screen shot that can be used to enter this information is shown in FIG. 7. These attributes can include any number of conditions, prices, restrictions, references, preferences, etc. that the licensee is willing to accept in order to license the digital content from the licensor and/or that the licensor is willing to accept in order to license the digital content to the licensee.

At block 320 a legal warranty that the licensor has the right to license the content can be received. The legal warranty, for example, can include an assertion or an acknowledgement that the licensor has the right to license the digital content. The licensor, for example, may own the digital content, may own the copyright to the digital content, and/or may have a license that allows them to sublicense the digital content to the licensee. This legal warranty can be acknowledged by the licensor through the website hosted by content marketplace. In some embodiments, this legal warranty can be important in order to limit any potential copyright liability on the content marketplace.

In some embodiments a global warranty can be made when the licensor signs up for services through the content marketplace. For instance, the licensor may warrant that they will not provide digital content that they do not have the rights to license.

At block 325 metadata, found on at the digital content host that is associated with the digital content can be searched for content attributes. These attributes can include the type of digital content such as whether the digital content is an image, music, video, programs, etc.; keywords associated with the digital content; descriptions of the digital content medium such as encoding, aspect ratio, storage size, etc.; and/or what is shown in the digital content such as description of a scene in a video or picture, a type of music, etc. In some embodiments, the licensor can add additional content attributes can be provided and/or additional descriptions of the digital content.

At block 330 the digital content can be indexed using the content attributes. The digital content can be indexed in order to provide a searchable index of the digital content. In this way, a licensee can enter a keyword search at the content marketplace and a listing of digital content will be provided that matches the search terms.

At block 335 the Internet address that points to the digital content can be embedded into the content marketplace. This can be done using HTML or other coding techniques that allow the digital content to be hosted by a third party yet displayed on the content marketplace webpage. Process 300 can end at block 340. The various blocks shown in process 300 can occur in any order. Moreover, blocks can be skipped or deleted, and/or other blocks may be added without limitation.

Figure 4:
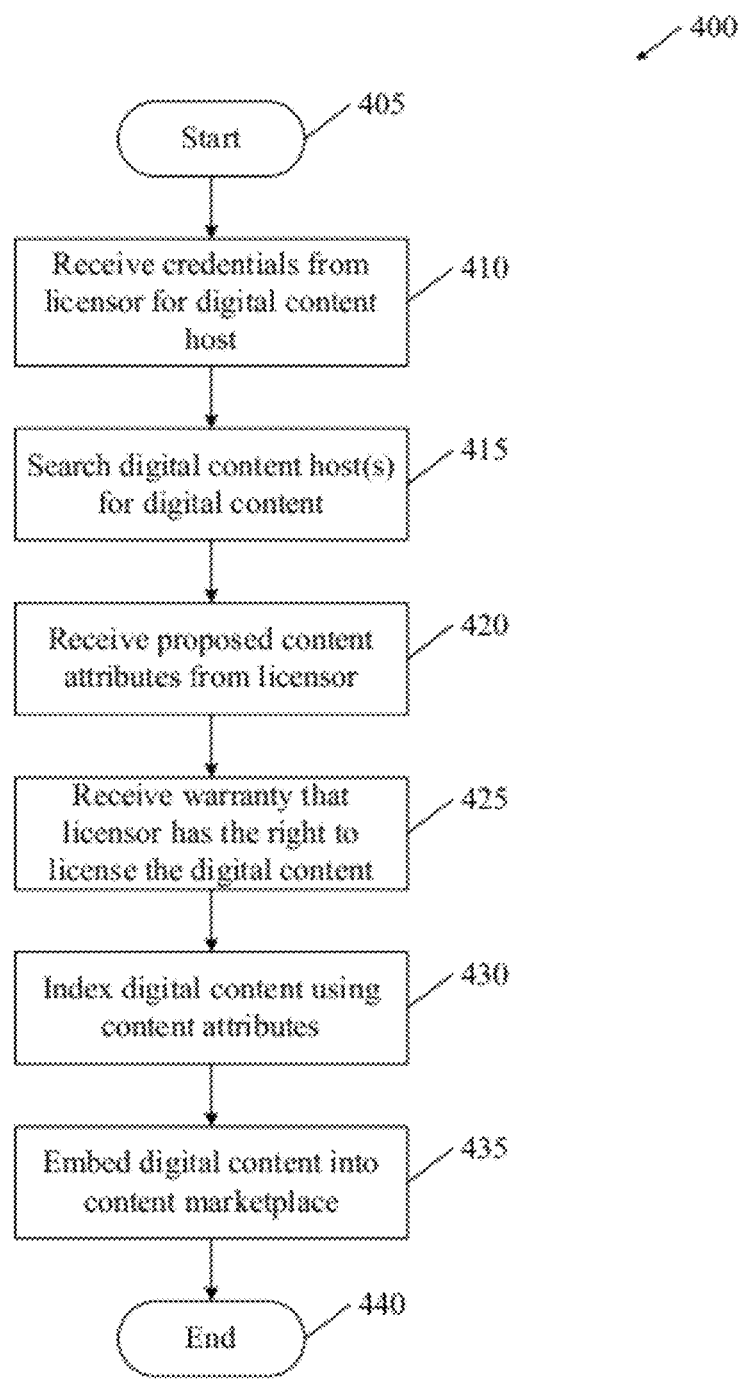
FIG. 4 is a flowchart of a process that can be used to receive an Internet address that points to the digital content from a licensor for entry into a content marketplace according to some embodiments of the invention.
Figure 8:
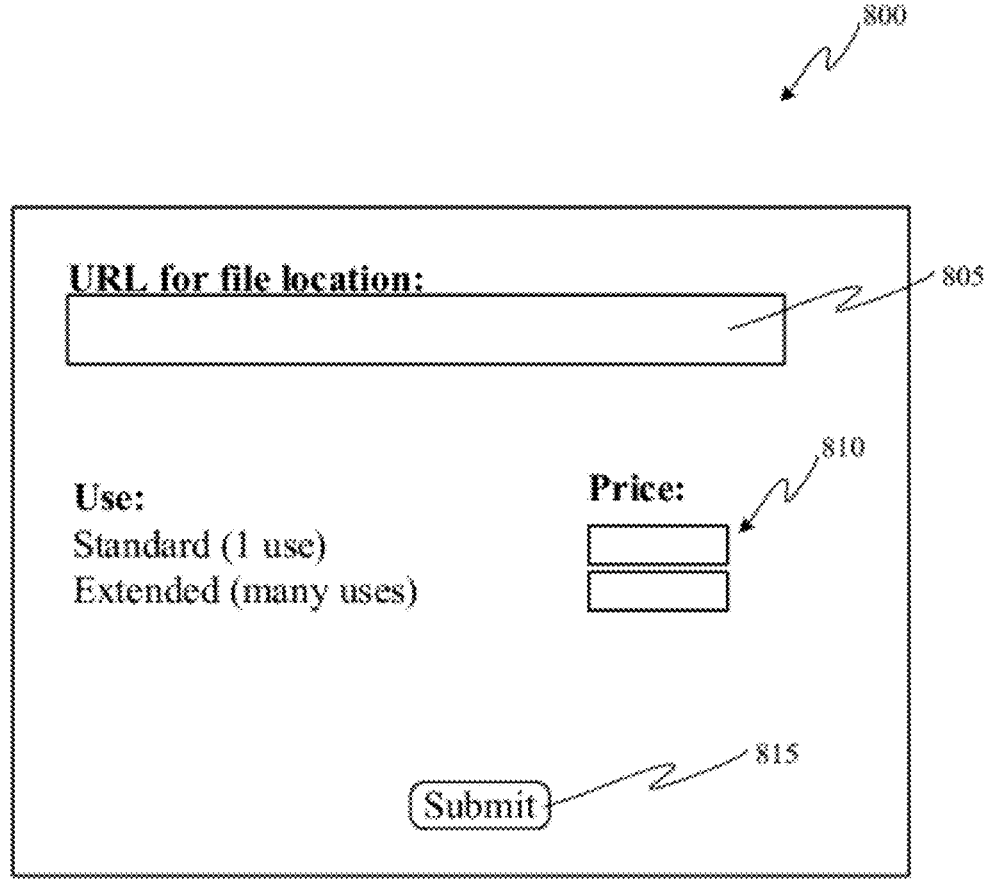
FIG. 8 shows a screenshot of a webpage that can be used by a licensee to provide an Internet address that points to the digital content that the licensee wishes to license according to some embodiments of the invention.

FIG. 4 is a flowchart of process 400 that can be used to receive an Internet address that points to the digital content from a licensor for entry into the content marketplace according to some embodiments of the invention. Process 400, for example, can be implemented by parser 112. Process 400 can start at block 405. At block 410 the licensor can provide account credentials for digital content hosts that host licensor's digital content. This can be done through a webpage hosted by the content marketplace. An example of a screenshot of such a webpage is shown in FIG. 8. The account credential can include a username and/or password specific to a given digital content host.

At block 415, the content marketplace or a computer used by the content marketplace can log into the various digital content hosts and search for digital content associated with licensor's account. The search can return one or more Internet addresses that point to digital content. At block 420, content attributes can be received from licensor. In some embodiments, the licensor can manually enter license attributes using a text box on the webpage. In some embodiments, these license attributes can be entered as default license attributes that can be used for all digital content associated with a given licensor. These default license attributes can be modified by the licensor for specific digital content. The license attributes can be received in a manner similar to what is described in block 315 of FIG. 3.

At block 425 a legal warranty that the licensor has the right to license the content can be received. Block 425 can be similar to block 320 of FIG. 3. Blocks 430 and 435 can be similar to blocks 325 and 330 respectively and can be repeated for each item of digital content found at block 415. Process 400 can end at block 440. The various blocks shown in process 400 can occur in any order. Moreover, blocks can be skipped or deleted, and/or other blocks may be added without limitation.

Figure 5:
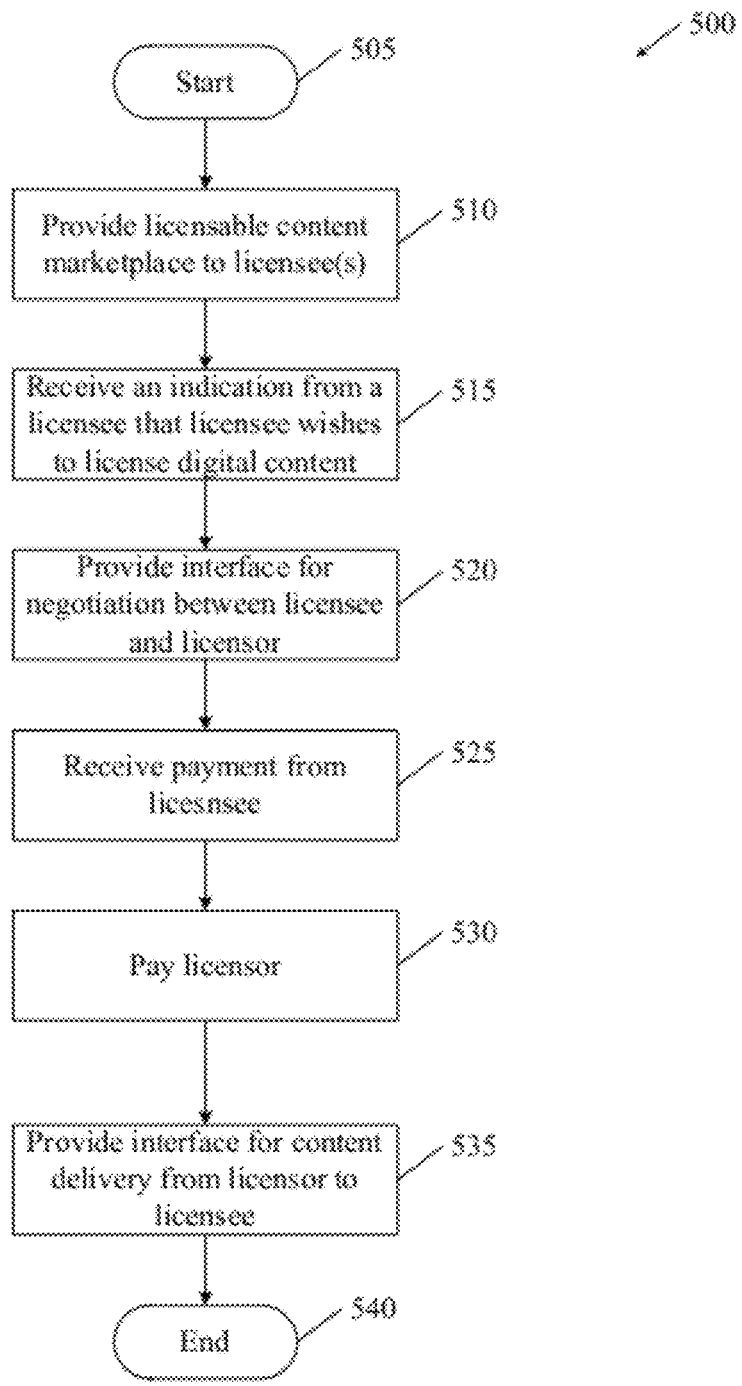
FIG. 5 is a flowchart of a process that can be used to provide a content marketplace for licensable digital content according to some embodiments of the invention.

FIG. 5 is a flowchart of process 500 that can be used provide a listing of digital content available for a license according to some embodiments of the invention. Process 500, for example, can be implemented by content marketplace 110. Process 500 can start at block 505. At block 510, digital content can be provided to licensees. This can occur, for example, by providing a website with a searchable index of licensable digital content using webserver 111.

At block 515 an indication can be received from a licensee that they wish to license a specific digital content listed on the content marketplace. This can be done, for example, when the licensee selects a "license" button on the website associated with the digital content.

At block 520 an interface can be provided for negotiations between licensor and the licensee for licensing the digital content (e.g., using transaction engine 114). This interface can include a webpage listing one or more selectable license attribute that the licensee may select in order to license the digital content. For example, the webpage can list a standard single use license with a price and with an extended use license for a higher price. A number of restrictions may also be provided. These restrictions can include such things as restricting the use of the digital content in pornography, political advertisements, campaigns related to violence, etc. The webpage may provide a text box or the like where the licensee can enter license attributes.

In some embodiments a license can be created using the license attributes or modified with the license attributes. Other license agreements can be used.

When the licensee and licensor agree to the license attributes, process 500 can receive payment from licensee at block 525. Payment can be remitted using any technique known in the art, for example, credit card payment, bill payment, money transfer, check, money order, debit of an account held by the content marketplace, PayPal, Google marketplace, etc.

At block 530, content marketplace can remit payment to the licensor using any technique known in the art, for example, credit card payment, bill payment, money transfer, check, money order, credit to an account held by the content marketplace, or money transfer to a bank account held by the licensor, PayPal, etc.

In some embodiments, the license attributes of digital content can be modified after a license transaction. This can occur, for example, if the licensee licenses the content for use in a specific geographical region or in a specific market (e.g., produce, apparel, automotive, movies, entertainment, television, websites, political campaign, corporate market etc.). This modification, for example, can provide restrictions to license attributes.

At block 535 an interface for digital content delivery can be provided (e.g., transaction engine 114). In some embodiments, the digital content is available from the digital content host and can be downloaded and used in another context by the licensee as specified by the license attributes. In other embodiments, only a representation of the digital content is provided by the digital content host. In such embodiments, the licensor can deliver the content in any number of ways known in the art. Content marketplace can provide recommendations for digital content delivery services such as, for example, iCloud, Dropbox, FTP, Aspera, T3 Library manager, etc.

Process 500 can end at block 540. The various blocks shown in process 500 can occur in any order. Moreover, blocks can be skipped or deleted, and/or other blocks may be added without limitation.

Figure 6:
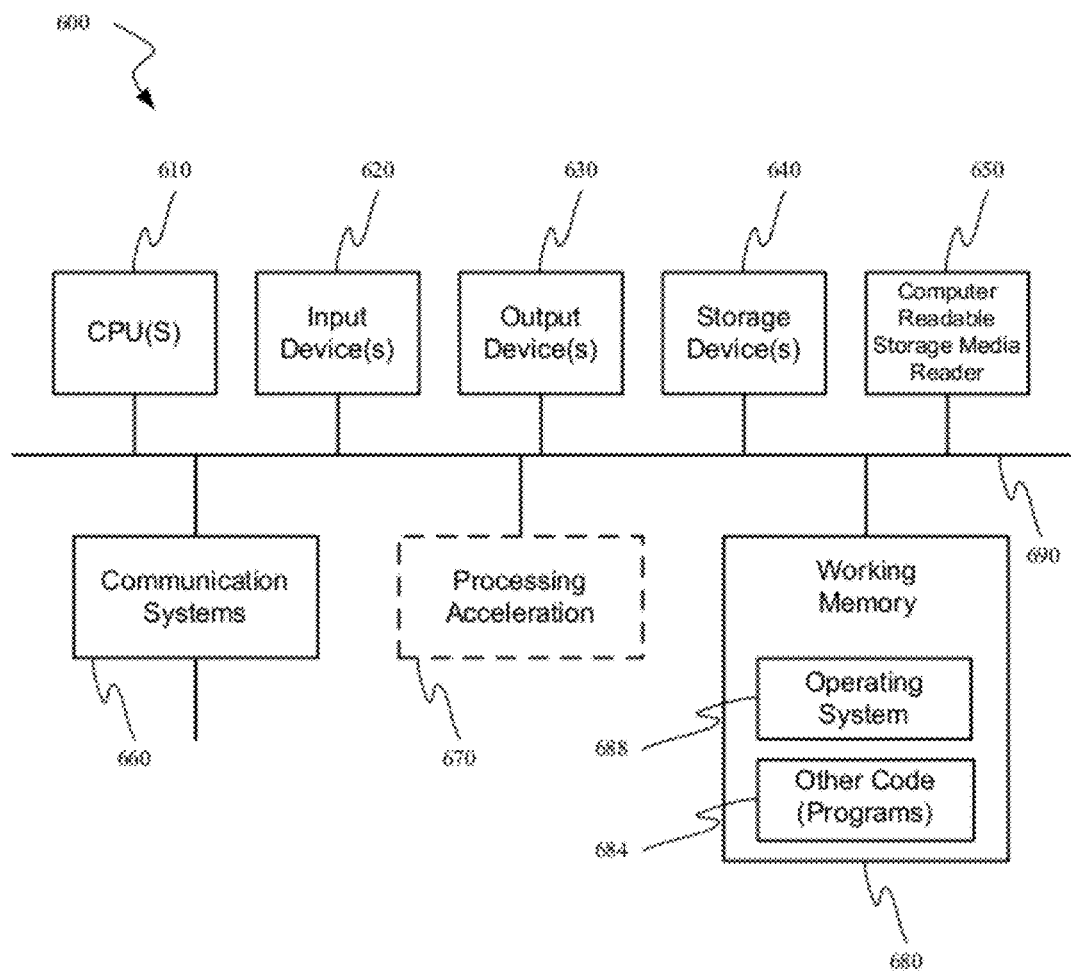
FIG. 6 illustrates a block diagram of a computer system capable of being used in at least some portion of the apparatuses or systems of the present invention, or implementing some embodiments of the invention.

FIG. 6 is a block diagram of computer system 600 in which embodiments of the present invention may be implemented. For example, processes 200, 300, 400, and/or 500 can be implemented using computer system 600. Moreover, Content marketplace 110 may comprise one or more computer systems like computer system 600. Similarly licensor and/or licensee can access content marketplace 110 using a computer system like computer system 600, and digital content host 104 can use a computer system like computer system 600.

This example illustrates a computer system 600 such as may be used, in whole, in part, or with various modifications, to provide the functions of the merchant subsystem, user subsystem, bill payment subsystem, gateway subsystem, and/or other components of the invention such as those discussed above. For example, various functions of the gateway subsystem may be controlled by computer system 600, including, merely by way of example, receiving electronic purchase transaction information, determining registration status of a purchaser, sending payment requests, receiving payment notifications, causing payments to be made, etc.

Computer system 600 includes hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). Computer system 600 may also include one or more storage device 640. For example, storage device(s) 640 may be disk drives, optical storage devices, solid-state storage device such as a random access memory ("RAM") and/or a read-only memory ("ROM"), which can be programmable, flash-updateable and/or the like.

Computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, computer system 600 may also include a processing acceleration unit 670, which can include a digital signal processor, a special-purpose processor and/or the like.

Computer-readable storage media reader 650 can further be connected to a computer-readable storage medium, together (and, optionally, in combination with storage device (s) 640) comprehensively representing remote, local, fixed, and/or removable storage devices plus storage media for temporarily and/or more permanently containing computer-readable information. Communications system 660 may permit data to be exchanged with a network, system, computer and/or other component described above.

Computer system 600 may also comprise software elements, shown as being currently located within a working memory 680, including an operating system 688 and/or other code 684. It should be appreciated that alternate embodiments of computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 684 for implementing any or all of the function of the various elements of the architecture as described herein. For example, software, stored on and/or executed by a system such as computer system 600, can provide the functions of the stored value provider subsystem, user subsystem, bill payment subsystem, gateway subsystem, and/or other components of the invention such as those discussed above. Methods implementable by software on some of these components have been discussed above in more detail.

FIG. 7 shows screenshot 700 of a webpage that can be used to enter license attributes according to some embodiments of the invention. The price for different uses can be entered in text field 705. As noted in the figure, different prices can be entered depending on the duration of the use. In some embodiments, text field 705 can be replaced by pull down menus or other web based menus or fields. In text field 710, the licensee can enter restrictions to the use of the digital content. A licensor can select Examples 715 to see examples of some frequently used or standard restrictions. For example, a licensor can restrict the licensee from using the digital content for pornographic, religious, and/or political purposes. Any type of restriction can be entered.

Button 718 can be used by the licensor to indicate that they are willing to entertain other offers and/or counter offers for the digital content. Buttons 720 can be used to indicate the type of license agreement that the licensor wishes to use. This can include a standard agreement provided by the content marketplace, a creative commons agreement, or the licensor's own license agreement. The license agreement can also include warranties by the licensor and/or licensee as a result of the transacting the license through the content marketplace. Various other agreement types may be included. If the button associated with "use your own agreement" is selected, then the licensor can be prompted to upload their agreement.

Text field 725 can be used to accept information about the delivery format of the digital content. This can include, for example, the format that the digital content can be delivered in. These can include the names of file extension representative of the digital content type, for example, MPEG, TIFF, JPG, PNG, QuickTime, MP3, etc. The licensee can select Examples 730 to see examples of some frequently used or standard delivery formats. Moreover, in some embodiments, a drop down menu or button menus can be used to allow the licensor to select the delivery formats that can be used. Text field 735 can be used to enter the URL for the digital content. In some embodiments, text field 735 can be used to specify the location of the actual digital content when a representation of the digital content was previously entered. Submit button 740 can be used to submit the data to the webserver. Various other buttons, text fields, pull down menus, widgets, etc. can be used.

Once the information requested through screenshot 700 is entered into the content marketplace, one or more license agreements can be prepared using the specific information entered. In some embodiments, a license agreement can be prepared only when the licensee selects the use. In other embodiments, license agreements can be prepared for all permutations of use or other attributes. In some embodiments, the information provided from screenshot 700 can be used to create a license only when an agreement has been reached.

In some embodiments, if the standard license agreement radio button is selected, then a standard license agreement can be prepared with the name of the licensor, use, price, restrictions, delivery formats, and/or URL included. In some embodiments, after an agreement has been reached the licensee name can also be entered. The standard license agreement document can include blank space or fields that can be populated with some or all of this data until license attributes have been agreed upon. For example, a field in the document can be populated with the restrictions listed in text field 710. Other portions of the license agreement document can be populated with information provided through this webpage.

Screenshot 700 is an example only. Various other layouts or formats can be implemented. Moreover, more or less information can be collected without limitation.

FIG. 8 shows screenshot 800 of a webpage that can be used by a licensee to provide an Internet address that points to digital content that he wants to license according to some embodiments of the invention. Text field 805 can be used by a licensee to enter a URL pointing to the digital content that the licensee wants to license. The licensee can enter license terms that they are willing to pay to license the digital content in text box 810. For example, the licensee can enter the price they are willing to pay for a standard license or an extended license. Various other license term or license attributes can be entered. Button 815 can be used to submit the data to the content marketplace.

Figure 9:
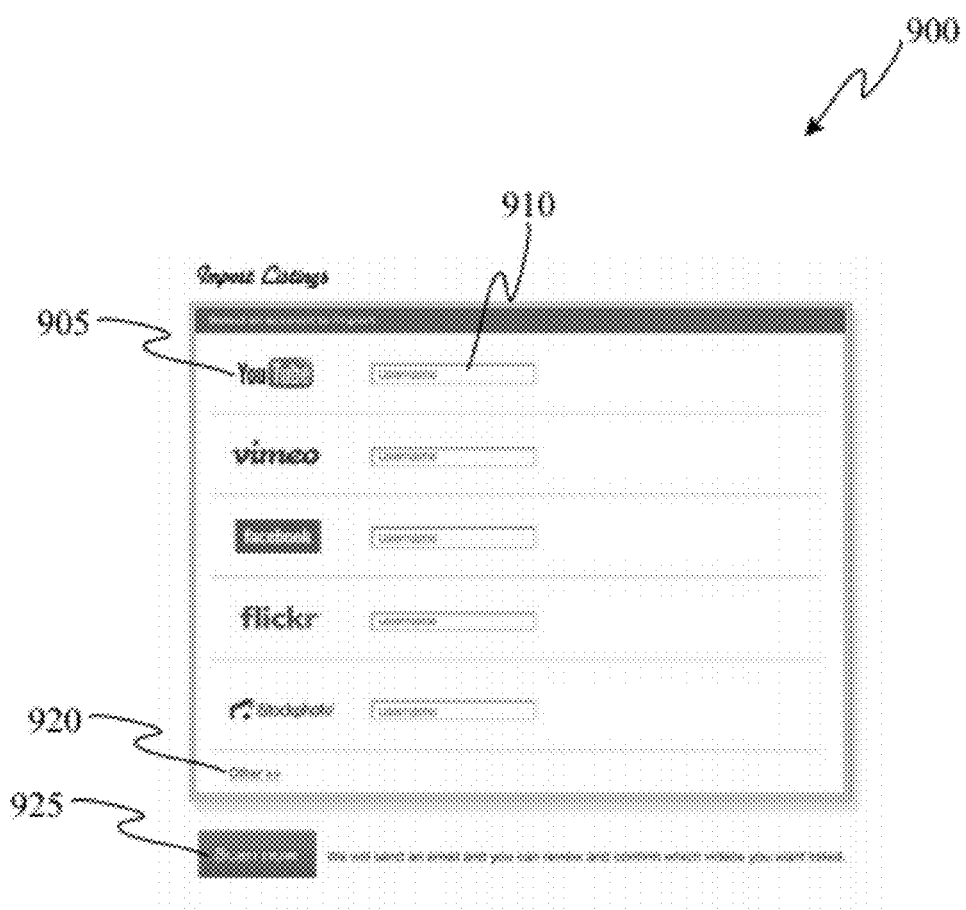
FIG. 9 shows a screenshot of a webpage that can be used to import digital content from multiple digital content hosts according to some embodiments of the invention.

FIG. 9 shows screenshot 900 of a webpage that can be used to import digital content from multiple digital content hosts (e.g., websites) according to some embodiments of the invention. A plurality of digital content hosts can be listed. These digital content hosts can include digital content host name 905 that can include, for example, YouTube, Vimeo, Facebook, Flickr, and iStockphoto. Various other digital content hosting sites can be listed. Text box 910 can be used by the licensor to enter her username for the associated digital content hosts. This can be done for one or more digital content hosts. For example, the username can be an account identifier, a Facebook ID, public username, etc. By selecting other 920 the licensor can enter the URL for another digital content host along with her username and/or password. When the licensor selects scan now button 925, the content marketplace can scan the licensor's account at the hosted digital content host for digital content.

Figure 10:
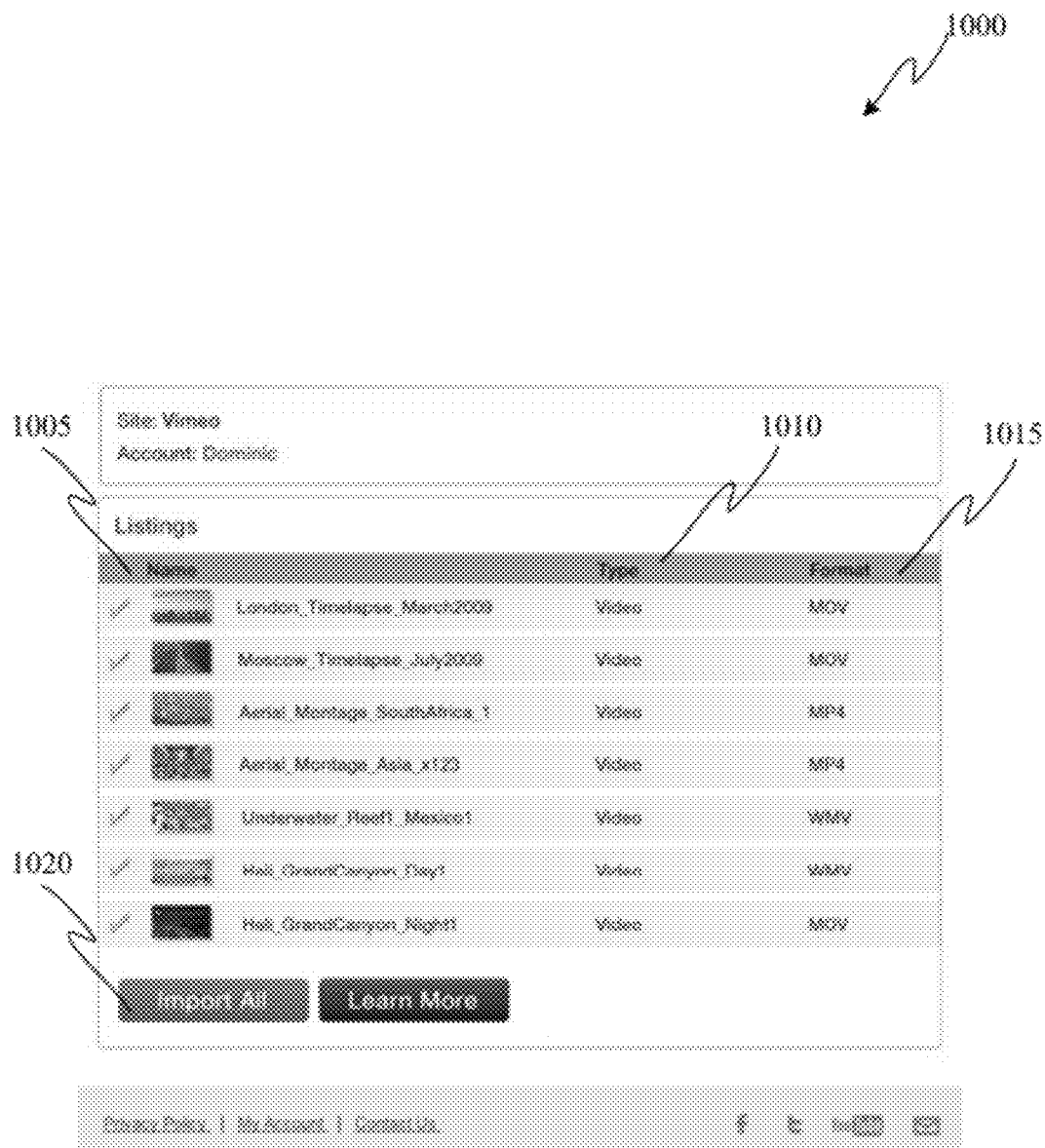
FIG. 10 shows a screenshot of a webpage or an email that can be used to list the digital content found at a specific digital content host according to some embodiments of the invention.

FIG. 10 shows screenshot 1000 can be part of a webpage or an email that can be used to list the digital content found at a specific digital content host according to some embodiments of the invention. This email can be sent to the licensor in response to the licensor's entry of her authentication credentials using, for example, screenshot 900. Screenshot 1000 can include the name of the licensor along with any message or advertisement. Names 1005 of the digital content found by scanning a specific site can be listed along with some content attributes such as content type 1010 and/or content format 1015. Other information about the digital content can be listed. Import all button 1020 can be used to import all the digital content into the content marketplace.

Figure 11:
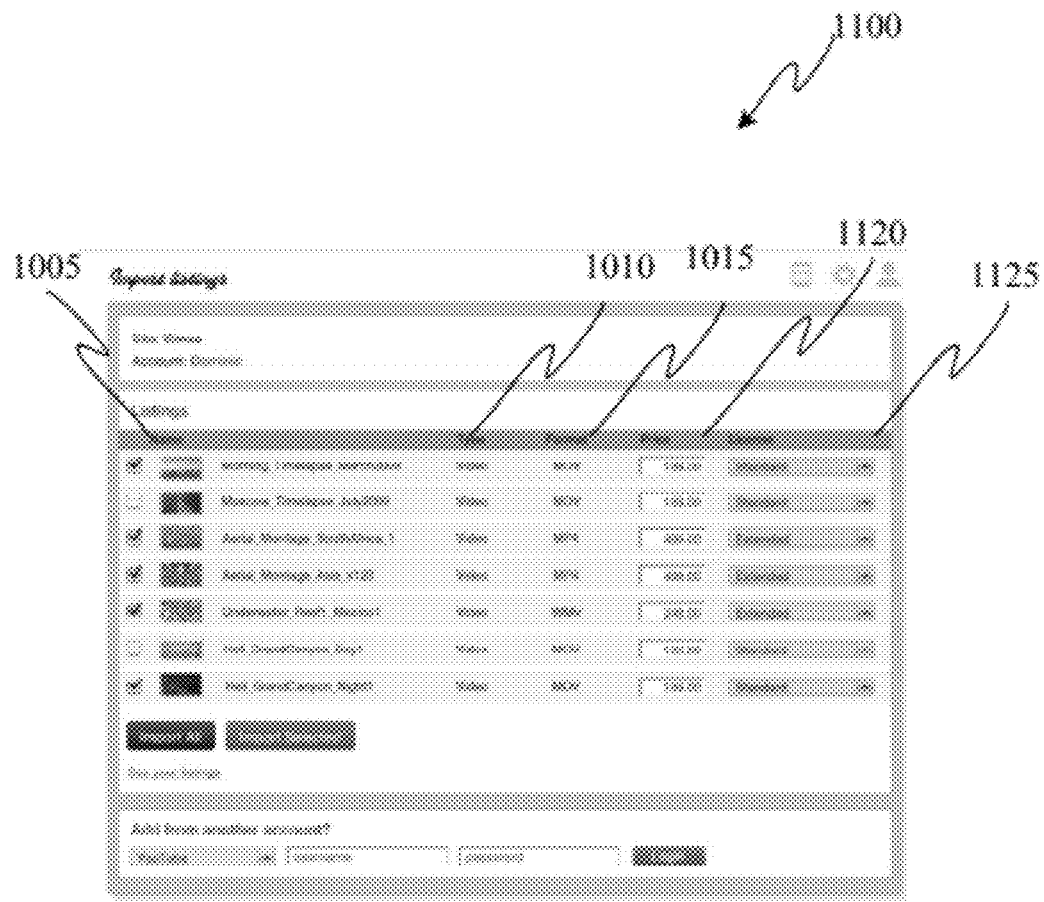
FIG. 11 shows a screenshot of a webpage or an email that can be used to list the digital content found at a specific digital content host according to another embodiments of the invention.

FIG. 11 shows screenshot 1100 of a webpage that can be used to list the digital content found at a specific digital content host and have the licensor enter some license attributes according to other embodiments of the invention. Content name 1005, content type, and content format can be provided as shown in FIG. 10. Text field 1120 can be provided for the licensor to enter a license price. Drop down menu 1125 menu can also be included to indicate the type of license that is available for the entered price. The license can be an exclusive license, a single use license, a multiple use license, etc. Various other license attributes can be listed. In this way, the licensor can embed multiple listings along with some license attributes. In some embodiments, while the term import may be used on various screenshots, the digital content is not imported to the content marketplace. Instead, the Internet address can be embedded into the content marketplace.

Figure 12:
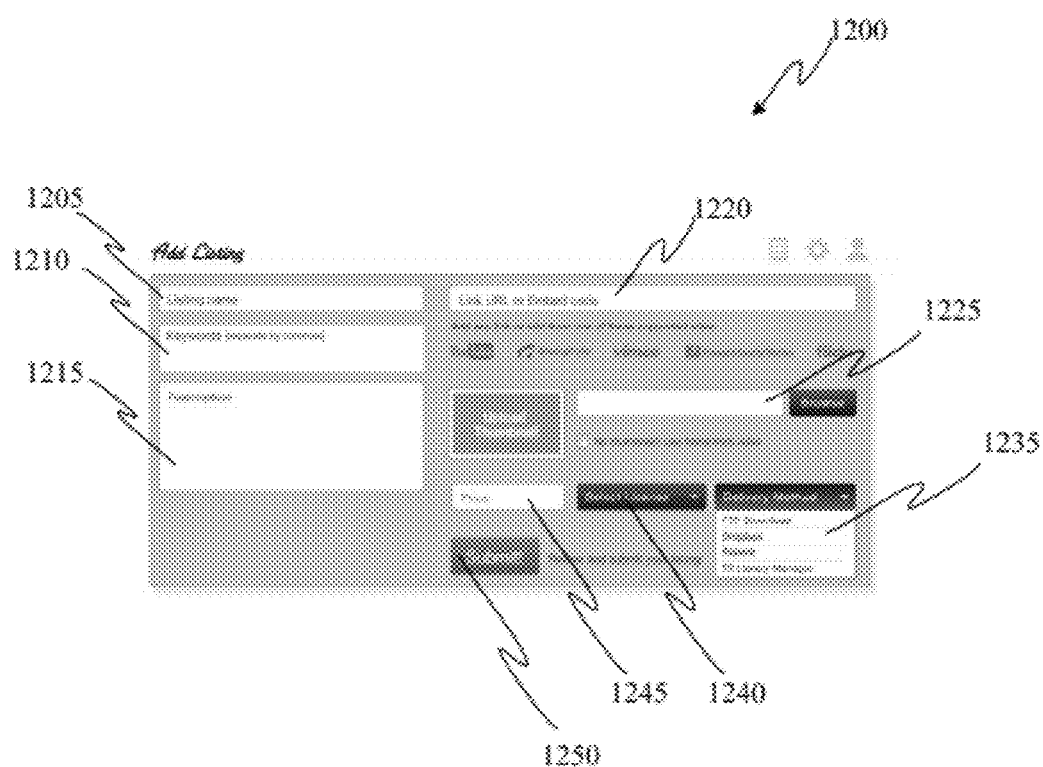
FIG. 12 shows a screenshot of a webpage that can be used to add a listing of digital content for the content marketplace according to some embodiments of the invention.

FIG. 12 shows screenshot 1200 of a webpage that can be used to add a listing of digital content for the content marketplace according to some embodiments of the invention. Text field 1205 can be used by the licensor to enter a listing name for the digital content. Keywords related to the digital content can be entered using text box 1210 and/or a description of the digital content can be entered in text box 1215.

Text field 1220 can be used to enter a URL or embed code pointing to the digital content. Text filed 1225 can be used by the licensor to upload a thumbnail related to the digital content. This thumbnail can be uploaded by browsing through the files on the computer. The thumbnail can be displayed on the webpage when it's uploaded. In some embodiments, a thumbnail may not be uploaded. For example, if the digital content is video, then a frame from video may be used as the thumbnail.

The delivery method of the digital content from the licensor to a potential license can be specified using drop down menu 1235. These can include any number of delivery methods from the licensor to the licensee. In some embodiments, the delivery method can be delivered to the licensee from the licensor and not from the content marketplace.

Dropdown menu 1240 can be used to select the license type. This can include, for example, standard license, extended license, single use license, etc. The price that the license selected in dropdown menu 1240 can be provided in text field 1245. When the licensor has completed entering information about the digital content, the licensor can select submit button 1250 to enter the information into the content marketplace.

In some embodiments of the invention, the content marketplace does not host or store the digital content (or a representation of the digital content) it offers for license. In some embodiments of the invention, the content marketplace does not manage or enforce license agreements. Instead, the content marketplace provides a forum where available digital content can be licensed based on various licensing attributes without hosting the digital content.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A method comprising:
    receiving from a licensee, at a computer system, an Internet address that points to digital content, wherein the digital content is located at a digital content host, and wherein a third party has rights to license the digital content;
    determining, at the computer system, a licensor from the Internet address that points to the digital content; and
    sending, by the computer system, an electronic message to the licensor with a request to license the digital content, wherein the electronic message specifies the digital content.

2. The method according to claim 1, wherein the Internet address points to a representation of the digital content.

3. The method according to claim 2, wherein the representation of the digital content is located at the digital content host.

4. The method according to claim 1, further comprising receiving a proposed license attribute from the licensee.

5. The method according to claim 1, wherein the determining a licensor form the Internet address that points to the digital content comprises determining contact information for the licensor from data associated with the Internet address and wherein the sending an electronic message sends the electronic message to the licensor.

6. The method according to claim 1, wherein the determining a licensor comprises:
    sending information to a representative; and
    receiving contact information from the representative.

7. The method according to claim 1, wherein the digital content host is hosted by a third party.

8. The method according to claim 1, wherein the proposed license attribute comprises a plurality of license attributes.

9. The method according to claim 1, wherein the electronic message includes the Internet address that points to the digital content.

10. The method according to claim 1, further comprising receiving an indication from the licensor that the licensor is willing to enter into a license agreement with the licensor with the license attribute.

11. The method according to claim 1, further comprising receiving an indication from the licensor providing a different license attribute.

12. The method according to claim 1, further comprising:
    determining an attribute of the digital content from metadata associated with the Internet address that points to the digital content;
    indexing the digital content based on the attribute of the digital content; and
    providing the digital content to licensees through a content marketplace, wherein the digital content is hosted at the digital content host and the content marketplace embeds the digital content using an Internet address that points to the digital content host.

13. The method according to claim 12, wherein the attribute of the digital content comprises a plurality of attributes of the digital content.

14. The method according to claim 1, wherein the license attributes includes one or more license attributes selected from the group consisting of license price, license duration, license terms, license restrictions, and license preferences.

15. A method comprising:
receiving, at a computer system, account identifiers from a licensor for an account at a digital content host containing digital content, wherein the digital content host is hosted by a third party;
automatically accessing the digital content host, by the computer system, using the account identifiers;
searching, by the computer system, the digital content host for digital content associated with the account;
identifying, by the computer system, an Internet address found on the digital content host that points to digital content found at the digital content host;
identifying, by the computer system, metadata associated with the digital content found on the digital content host;
embedding, by the computer system, an Internet address that points to the digital content found at the digital content host on a content marketplace website; and
indexing, by the computer system, the digital content using either or both the Internet address and the metadata.

16. The method according to claim 15, providing the digital content to licensees through a content marketplace website, wherein the digital content is hosted at the digital content host and the content marketplace embeds the digital content using an Internet address that points to the digital content host.

17. The method according to claim 15, wherein the Internet address found on the digital content host points to a representation of the digital content that will be licensed.

* * * * *